United States Patent [19]

Salzgeber

[11] 4,432,327

[45] Feb. 21, 1984

[54] TIMING CONTROL FOR FUEL INJECTION PUMP

[75] Inventor: Daniel E. Salzgeber, Windsor, Conn.

[73] Assignee: Stanadyne, Inc., Windsor, Conn.

[21] Appl. No.: 354,649

[22] Filed: Mar. 4, 1982

[51] Int. Cl.³ .................................... F02M 59/20
[52] U.S. Cl. ................................. 123/502; 123/501
[58] Field of Search ............... 123/502, 501; 417/462

[56] References Cited

U.S. PATENT DOCUMENTS

| 3,101,078 | 8/1963 | Evans | 123/502 |
| 3,897,764 | 8/1975 | Bakti | 123/502 |
| 4,037,573 | 7/1977 | Swift | 123/502 |
| 4,052,971 | 10/1977 | Salzgeber et al. | 123/502 |
| 4,074,667 | 2/1978 | Skinner | 123/502 |
| 4,224,916 | 9/1980 | Davis | 123/502 |
| 4,329,961 | 5/1982 | Johnston | 123/502 |

FOREIGN PATENT DOCUMENTS

| 1143675 | 2/1963 | Fed. Rep. of Germany . |
| 2638736 | 3/1978 | Fed. Rep. of Germany . |
| 3017000 | 11/1980 | Fed. Rep. of Germany . |
| 2052647A | 1/1981 | United Kingdom | 123/502 |
| 2054206A | 2/1981 | United Kingdom | 123/502 |
| 1586215 | 3/1981 | United Kingdom . |

Primary Examiner—Ira S. Lazarus
Assistant Examiner—Magdalen Moy
Attorney, Agent, or Firm—Prutzman, Kalb, Chilton & Alix

[57] ABSTRACT

A fuel injection pump having a timing piston shiftable for establishing the fuel injection timing, a servo valve piston for hydraulically positioning the timing piston, biased in the advance direction by a speed correlated fluid pressure, engine load responsive means acting through a compression spring to bias the servo valve piston in the retard direction, a bleed valve for establishing a regulated fuel pressure biasing the servo piston in the retard direction, the bleed valve being biased in its opening direction by the regulated pressure, and bleed valve control means responsive to continuous measurements of one or more operating parameters of an associated engine and acting through a compression spring to variably bias the bleed valve in its closing direction.

15 Claims, 4 Drawing Figures

TIMING CONTROL FOR FUEL INJECTION PUMP

This invention relates generally to fuel injection pumps of the type employed for delivering discrete measured charges of liquid fuel to an associated internal combustion engine of the compression-ignition type. More particularly, this invention relates to a new and improved control for timing the injection of fuel into the engine cylinder.

Obtaining precise timing of the fuel injection into the cylinder in relation to the top dead center (TDC) position of the piston is a critical factor in minimizing the discharge into the environment of pollutants from the exhaust of the internal combustion engine, as well as minimizing the engine noise level. More precise regulation of the timing of the fuel injection is necessitated by increasing environmental considerations and regulatory mandates. Improved injection timing regulation results from both a more precise means for advancing and retarding the timing of fuel injection and also means for taking into account more operating parameters of the engine when determining the optimum degree of timing advancement or retarding to be applied.

The injection of fuel in compression-ignition or diesel engines normally occurs at a time when the piston is in the vicinity of its TDC. The desired time of fuel injection varies for different engine designs and ranges from a time slightly prior to TDC to a time slightly after TDC. In the normal course of operating an engine, various operating parameters such as speed, load, engine temperature, and altitude may vary over ranges which require timing adjustments which are substantial enough to have a significant impact on obtaining optimum timing of fuel injection.

A number of general considerations have been established. As the engine speed in r.p.m. increases, the timing of fuel injection should normally occur earlier relative to TDC. The time interval for fuel to flow from injection pump to injection nozzle is not a function of engine speed although the time required for combustion in the engine is a function of engine speed. Therefore, a mechanism is frequently employed to adjust the timing of fuel injection to compensate for wide ranges in engine speed. A second important factor requiring timing adjustment may result from engine load differences or changes in r.p.m. For example, advancing the timing of fuel injection for fast acceleration is generally advantageous. A third timing adjustment may be required to compensate for engine temperature. It is generally advantageous to advance the timing of fuel injection in a cold engine operating at relatively low speed. A fourth factor for which an adjustment in injection timing is desirable is the altitude at which the engine is operating. In general, at higher altitudes the timing of fuel injection should be advanced. Other factors, such as pump wear and fuel density, may also require an adjustment of the setting of the timing mechanism to obtain the desired timing of injection.

In injection pumps wherein the contour of a cam is translated into pumping strokes of plungers actuated by the cam, the fuel injection timing may be provided by a timing control acting on the cam to advance or retard the timing of the injection pumping stroke, and to consequently provide for a control of the timing of the injection of fuel into the engine cylinder. A timing control piston may be provided to mechanically interact with the cam to advance or retard the timing corresponding to the relative position of the piston in a hydraulically controlled cylinder.

A number of means for regulating the timing of fuel injection have been directed to effecting the position of a timing control piston under various engine operating conditions. U.S. Pat. No. 4,224,916 in the name of Charles W. Davis discloses a timing control for a fuel injection pump wherein the position of a timing piston is adjusted in response to the increase in engine speed. Application Ser. No. 144,033 filed Apr. 29, 1980 in the name of Daniel E. Salzgeber discloses a means for effecting the position of a timing piston and consequently the advance of the fuel injection to compensate for conditions when the engine is cold.

The present invention is directed to incorporating additional engine operating parameters such as altitude, engine temperature, and injection pump wear factors into the means for determining and providing the precise desired timing of the fuel injection. The invention is suitable for obtaining an injection timing window on the order of one-half engine crank degrees and for providing an injection timing advance as high as fourteen engine crank degrees.

SUMMARY OF THE INVENTION

Briefly, the invention in a preferred form comprises a drainage passage leading from a cylinder enclosing a timing piston of an injection pump. The timing piston interacts with a cam to advance or retard the pumping stroke of the injection pump. The drainage passage leads to a vent which is controlled by a valve which is capable of selectively controlling the flow of fluid from the cylinder chamber to the pump housing. The valve is driven by a linear stepper motor which is responsive to an electronic command unit. The electronic command unit continuously produces output pulses which are dependent upon one or more continuous input measurements indicative of engine operating parameters such as altitude, engine temperature, engine speed, engine load, fuel density, fuel injection angle and/or top dead center of the engine piston. In second form of the invention, the control valve is mechanically responsive to the altitude of engine operation which is measured by an aneroid device.

A principal object of the invention is to provide a new and improved timing control for a fuel injection pump which is failsafe.

Another object of the invention is to provide a new and improved timing control for a fuel injection pump which will advance or retard the timing of fuel injection to compensate for changes in altitude.

Still another object of the invention is to provide a new and improved timing control for a fuel injection pump which can employ microprocessor or analog electronic control units to more precisely determine and update the optimum timing compensation for various engine operating parameters.

A still further object of the invention is to provide a new and improved timing control for a fuel injection pump wherein the timing control will remain at least partially operable in the event of failure of the electronic components.

A still further object of the invention is to provide a new and improved timing control for a fuel injection pump having increased timing accuracy.

Other objects and advantages of the invention will become apparent from the drawings and detailed description.

DETAILED DESCRIPTION

Figure 1:
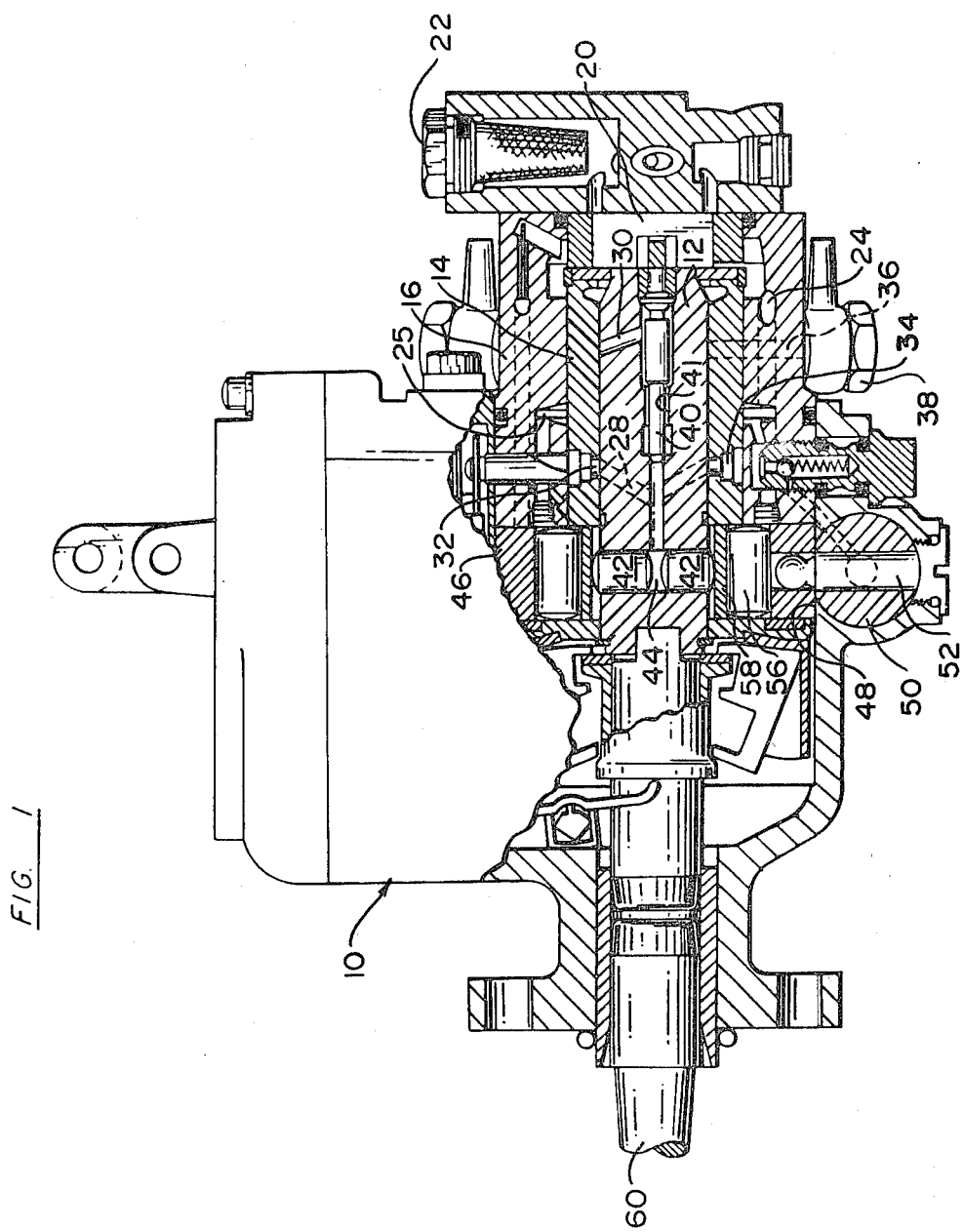
FIG. 1 is a longitudinal side elevational view, partly in section and partly broken away, of a fuel injection pump employing a timing control illustrating a preferred embodiment of the present invention.

With reference to FIG. 1, an exemplary fuel injection pump of the type commercially used for supplying discrete measured charges of liquid fuel to an associated compression-ignition engine is disclosed for illustrating the present invention. The pump includes a housing 10 and a distributor rotor 12 journaled in a bore of a fuel distributor sleeve 14 which is sealed within a bore of a hydraulic distributor head 16 mounted within the pump housing 10.

Mounted at one end of the rotor 12 for rotation therewith is a low pressure vane type transfer pump 20 having an inlet 22 to which fuel is supplied from a supply tank (not shown). The outlet of the transfer pump 20 is connected to an annulus 25 in the hydraulic distributor head 16 by a passage 24.

The rotor 12 is shown as having a pair of fuel inlet passages 28 and a fuel discharge passage 30.

As the rotor 12 turns, the inlet passages 28 of the rotor 12 register sequentially with a plurality of radial ports 32 (only two of which are shown) uniformly spaced around the sleeve 14 in a plane of rotation of the inlet passages 28 to provide periodic communication between the annulus 34 and an inlet passage 28 for supplying fuel to the rotor 12. The discharge passage 30 similarly communicates sequentially with a plurality of passages 36 (only one of which is shown). Passages 36 are uniformly spaced around the sleeve 14 in the plane of rotation of the discharge passage 30 as the rotor 12 turns to sequentially deliver pressurized fuel charges from the rotor to a plurality of fuel connectors 38 for delivery of the fuel charges to the cylinders of an associated engine (not shown). A delivery valve 40 located in an axial passage 41 in the rotor 12 controls the backflow of pressurized fuel from the discharge passage 30.

The rotor 12 has an enlarged generally cylindrical portion with a diametral bore which mounts a pair of diametrically opposed plungers 42 for reciprocation therein. The space between the inner ends of the plungers 42 forms a high pressure pump chamber 44 connected to the inlet passages 28 and the discharge passage 30 by the axial passage 41 to alternately receive and discharge fuel as the rotor 12 turns.

Surrounding the plungers 42 in their plane of revolution is a generally circular cam ring 46. The cam ring 46 is mounted in a bore 48 of the housing 10 for limited angular movement and its angular position is controlled by a timing piston 50 operatively connected thereto by a connector 52.

The cam ring 46 has an inner annular cam surface with a plurality of inwardly projecting cam lobes 54 which are positioned to simultaneously actuate the diametrically opposed plungers 42 inwardly. For that purpose, a roller assembly comprising a roller 56 and a roller shoe 58 is disposed between each plunger 42 and the cam ring 46 so that the rollers 56 act as cam followers for translating the cam contour into reciprocable movement of the opposed plungers 42.

In operation, as the rotor 12 is driven by the engine through drive shaft 60, low pressure fuel from the transfer pump 20 is delivered through a port 32 to a rotor inlet passage 28 to the pump chamber 44, it being understood that opposed rollers 56 are angularly disposed with respect to the cam lobes 54 of the cam ring 46 to permit the plungers 42 to move radially outwardly in synchronism with registry of an inlet passage 28 with each port 32 so that fuel can enter chamber 44. As the rotor 12 continues to turn, the inlet passage 28 moves out of registry with the port 32 and the plunger actuating rollers 56 roll up leading surfaces of a pair of cam lobe 54 to power the plungers 42 inwardly and pressurize a charge of fuel in the pump chamber 44 to a high pressure. At this time the discharge passage 30 has moved into registry with a delivery passage 36 connected to one of the cylinders of the engine for injection of a charge of fuel thereto under high pressure.

Continued rotation of the rotor repeats the process for sequential delivery of a charge of fuel to each cylinder of an associate engine in timed relation therewith.

Figure 2:
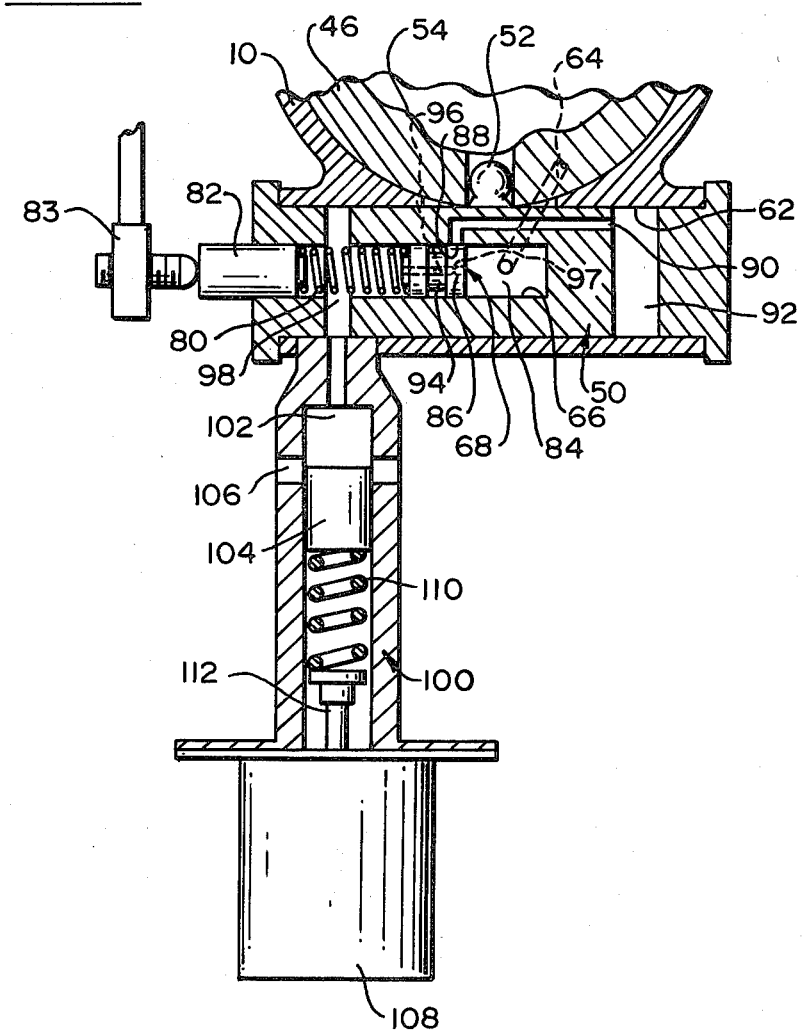
FIG. 2 is an enlarged fragmentary end view, of the fuel injection pump of FIG. 1, partly in section and partly broken away.

With reference to FIG. 2, cam ring 46 is mounted so that it can be angularly adjusted to control the timing of the pumping strokes of plunger 42. The pumping strokes can be adjusted to occur slightly sooner (advanced) or slightly later (retarded) as the drive shaft 60 is rotated. Connector 52 provides means for rotatably shifting the cam ring 46 to adjust the timing.

Connector 52 is driven by a timing piston 50 which is received in a cylinder 62 of the housing 10. Cylinder 62 extends tangentially to and in substantially the same plane as cam ring 46. Piston 50 connects with connector 52 so that the upper portion of connector 52, which interacts with cam ring 46, is movable longitudinally with respect to cylinder 62.

Piston 50 further provides an axial bore 66 in which a servo valve 68 is slidably received. A servo biasing spring 80 engages one end of servo valve 68 to bias the servo valve to the right as illustrated in FIG. 2. The opposite end of spring 80 engages a spring seat 82 which is received in the left end of cylinder 62.

The longitudinal position of spring seat 82 relative to cylinder 62 may be varied to produce an increase or decrease in the bias exerted by spring 80 on servo valve 68. In a preferred embodiment, spring seat 82 is longitudinally moved in response to a lever arm 83 which is mechanically actuated by an increase in engine load such as the timing control for fuel injection pump disclosed in U.S. Pat. No. 4,224,916.

In operation, regulated transfer pump output pressure is continuously present in valve chamber 84 defined in piston bore 66 by the end of servo valve 68. The pressure in valve chamber 84 exerts a force on servo valve 68 in opposition to the biasing force of servo spring 80. Because the output pressure of the transfer pump is a function of engine speed, the position of servo valve 68 is dependent on engine speed.

As the engine speed increases, the pressure in valve chamber 84 increases to compress spring 80 so that the land 86 of the servo valve uncovers port 88 of passage 90 and fuel passes from chamber 84 into chamber 92 as defined between piston 50 and the right end of cylinder 62, as illustrated in FIG. 2. As the quantity of fuel in chamber 92 increases, timing piston 50 is forced to the left as shown in FIG. 2 until land 86 covers port 88 of passage 90 to terminate the flow of fuel between chambers 84 and 92. The termination of the fuel flow from chamber 84 to 92, determines an equilibrium position of piston 50 which in turn, acting through connector 52, fixes the angular position of cam ring 46 and consequently the timing of injection of fuel into the cylinder of the engine.

Upon the decrease of engine speed, the pressure in chamber 84 decreases, resulting in spring 80 forcing servo valve 68 to the right to provide communication between passage 90 and annulus 94 so that fuel is dumped from chamber 92 through bore 96 which communicates with the interior of the pump housing 10, as will be described below, until an equilibrium position of timing control piston 50 is attained.

The foregoing operational description of timing piston 50 essentially provides a means for adjusting the timing to correspond to engine speed, and with respect to the adjustment of spring seat 82, to adjust timing piston 50 in relation to increase or decrease in engine load. As illustrated in FIG. 2, the injection timing is advanced when timing piston 50 moves to the left. Timing is retarded as piston 50 moves to the right.

With further reference to FIG. 2, additional means for regulating the timing of injection, shown generally as 100, comprises a passage 102 which communicates with chamber 98 defined between spring seat 82 and the end of servo valve 68. Note that chamber 98 also communicates with bore 96. Control valve 104 is positioned in passage 102 to selectively control the bleeding of fuel through vent 106. Vent 106 communicates with the interior of the pump housing 10.

In a preferred embodiment, control valve 104 is driven by a linear stepper motor 108, as will be described in detail below. Control valve 104 may also be biased by a spring 110. An important characteristic of control valve 104 is that it may be positioned in a number of positions relative to vent 106 so as to selectively impede the flow of a fluid from passage 102 through vent 106.

As illustrated in FIG. 2, the vertical position of the top of control valve 104 is governed by linear stepper motor 108. Linear stepper motor 108 has a vertical shaft 112 which drives conrol valve 104. The vertical position of shaft 112 is determined by an electrical signal or pulse from an electronic command unit (not shown).

A preferred form of stepper motor 108 is a bidirectional linear actuator having an internally threaded rotor fitted with a lead screw shaft. The shaft moves in linear increments in either a forward or reverse direction upon each energization of the coils of the motor in proper sequence. The shaft 112 remains in a fixed position when between pulses of applied power.

It should be noted that the linear stepper motor 108 essentially provides a non-reversible drive in the sense that shaft 112 drives control valve 104, but control valve 104 cannot drive shaft 112.

In the absence of a further signal pulse from the electronic control unit, control valve 104 maintains a fixed vertical position. These latter characteristics of stepper motor 108 act to provide a control system that is failsafe in the event of electrical or electronic system failure since the advance piston is still adjustable by changes in speed and load although it is not adjusted or tuned by changes in the parameters which serve to control the energization of motor 108. Rather, the shaft 112 will remain in the fixed position it was in prior to electronic failure.

The electronic control unit may take a variety of forms, such as an electronic analog unit or a microprocessor unit. Such electronic control units are well known and their specific form is not a part of the present invention.

Figure 3:
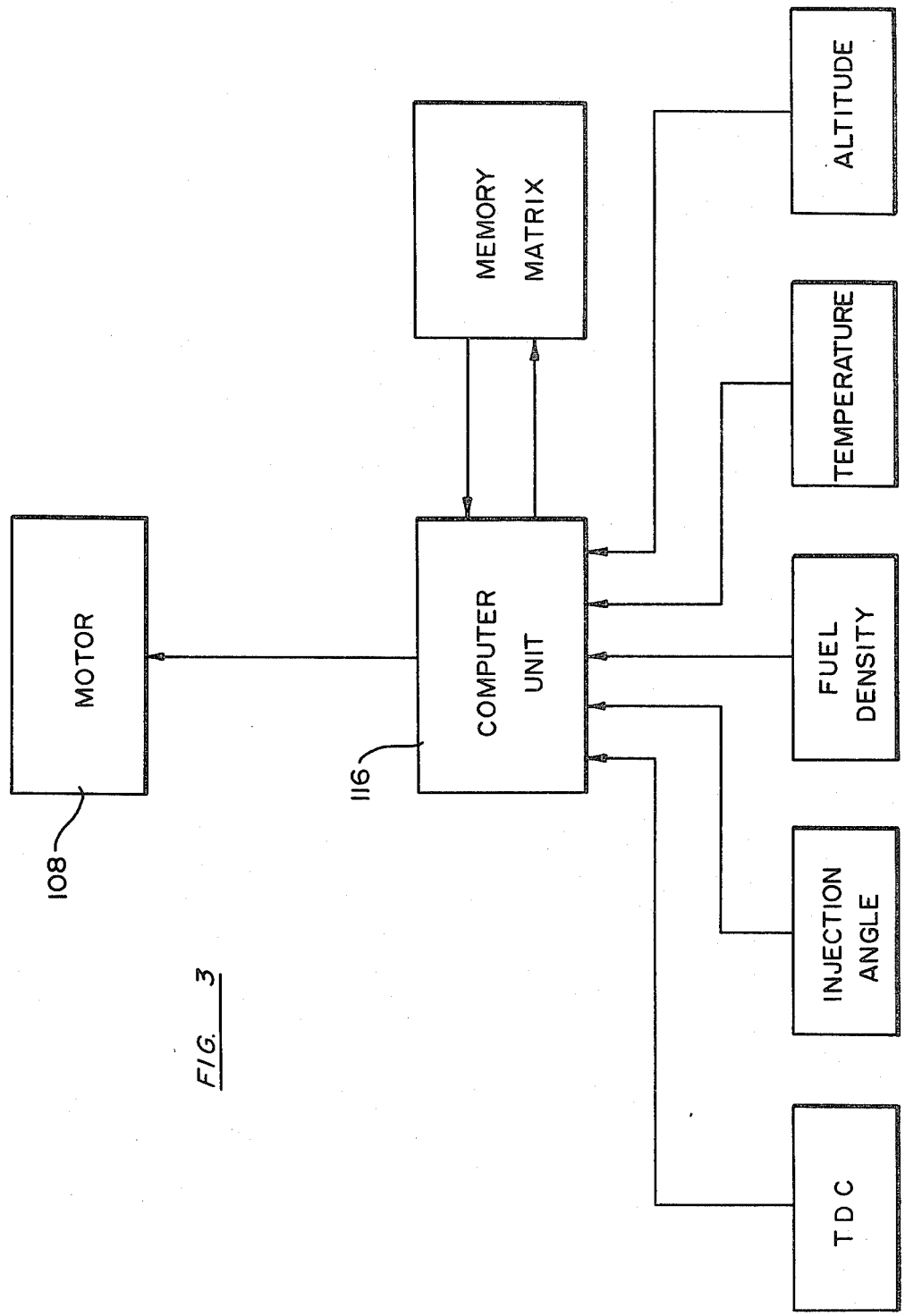
FIG. 3 is a schematic diagram illustrating a sequence of operations which may be employed in connection with the timing control.

With reference to FIG. 3, a schematic of a logic diagram which is generally illustrative of a general operational command form of a suitable electronic control unit is set forth. A computer unit 116 may continuously receive one or more input pulses indicative of measurements of engine speed, the occurrence of top dead center of a piston, the actual injection angle of the fuel relative to TDC, the density of fuel, the temperature of the engine and the altitude. All of the foregoing engine operating parameters may be obtained by a number of conventional techniques and devices which are not the specific focus of the present invention. For example, engine speed and the occurrence of TDC may be obtained by means of a magnetic pick-up. The injection angle may be obtained by means of a suitably positioned transducer which detects the increased pressure due to the injection of the fuel charge. The operating engine temperature may be measured by means of a thermistor sensing the temperature of the engine coolant. The altitude may be measured by means of an aneroid device or other conventional means.

In general, the computer unit processes the input measurements to produce an output indicative of the optimum injection timing compensation which is applicable for the given input measurements. For each engine operating parameter, the continuous measurements may form a data set. Each data point may be instantaneously compared with a corresponding data point of a data matrix or memory means constructed to yield the optimum injection timing over the entire operational range for each parameter. By continuously measuring the actual angle of fuel injection, the optimum timing compensation may be updated virtually instantaneously. It can be seen that a timing compensation factor may be determined by using the measured parameter to determine the optimum timing advance or retard from the established data matrix and comparing the optimum timing with the actual timing of the engine.

The resultant timing compensation determined by the computer unit is then communicated in the form of electrical pulses to the linear stepper motor 108 for actuation of control valve 104.

In operation, the transfer pressure from the valve chamber 84 to the spring chamber 98 communicates with vent passage 102 and may ultimately communicate through vent 106 to the housing 10. By impeding the flow of pressure through vent 106 by means of control valve 104, the pressure in chamber 98 can be regulated and thus the position of servo valve 68 may be further regulated. Although fuel feed to the chamber 98 through bore 96 is shown as providing a fixed orifice 97 to supply a restricted flow of transfer pressure, leakage around the servo valve 68 into the spring chamber 98 can be designed to provide flow from chamber 84 to chamber 98, in which case bore 96 is not required.

The control pressure is progressively released into the housing as the top of control valve 104 moves downwardly relative to vent 106 allowing for increased fuel flow to the housing. In the embodiment of FIG. 2, servo valve 68 tends to move to the left with increased fuel flow through vent 106, resulting in a consequent moving of timing piston 50 to the left and a resultant timing advance, provided means other than control means 100 are not also effecting the position of piston 50.

As the control pressure is progressively increased, i.e., by control valve 104 impeding the fluid release through vent 106, the resultant pressure buildup tends to bias servo valve 68 to the right relative to cylinder 62. The movement of the servo valve to the right thus results in the movement of piston 50 to the right and the retarding of the timing of injection.

It should be understood that the previously described means for controlling the position of timing piston 50 in cylinder 62 through the employment of a hydraulically controlled servo valve 68 is essentially dependent upon as many as three distinct mechanisms for controlling the piston position. Acting in concert, each of the three mechanisms may provide for a timing adjustment dependent upon one or more unrelated engine operating parameters. It is a particular feature of the invention that the timing control adjustment means is failsafe in that in the event of a failure of electronic components or faulty engine parameter measurements, means are still provided for timing adjustment due to variations in engine speed and engine load.

Figure 4:
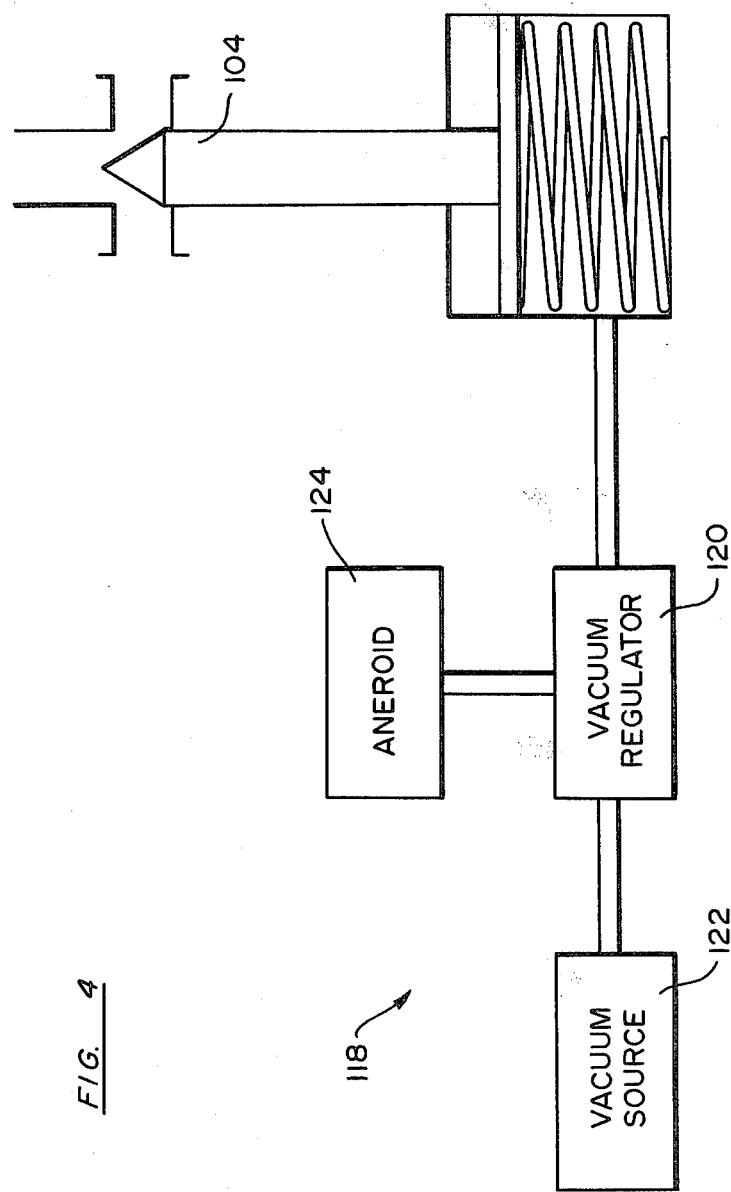
FIG. 4 is a schematic diagram illustrating a timing control which is responsive to altitude.

With reference to FIG. 4, an alternate embodiment of the invention may be provided wherein the position of control valve 104 is responsive to the altitude of engine operation. In such an embodiment, a non-electronic control means is provided wherein the position of control valve 104 is governed by a device 118 which is dependent upon atmospheric pressure. The device 118 in general may take the form of a vacuum regulator 120 in communication with a vacuum source 122 and an aneroid device 124 so that a change in altitude produces a corresponding change in position of control valve 104. As schematically illustrated in FIG. 4, at a higher altitude, control valve 104 moves vertically downward, thus offering a lesser restriction to the flow of fuel from chamber 98 (FIG. 2) resulting in the advancement of the injection timing.

It may thus be seen that the objects of the invention set forth as well as those made apparent from the foregoing description are efficiently attained. While preferred embodiments of the invention have been set forth for purposes of disclosure, modifications of the disclosed embodiments of the invention as well as other embodiments thereof may occur to those skilled in the art. Accordingly, the appended claims are intended to cover all embodiments of the invention which do not depart from the spirit and scope of the invention.

What is claimed is:

1. For use in association with an internal combination engine having a plurality of engine cylinders, a fuel injection pump having a housing, a charge pump to deliver measured charges of liquid fuel in successive pumping strokes to the cylinders of the associated engine, timing means to vary the timing of the pumping relative to the operation of the associated engine, and actuating means for actuating the timing means for advancing and retarding the timing of the pumping strokes responsive to the operating parameters of the associated engine, said actuating means comprising a spring biased piston for actuating the timing means and having fluid chambers at opposite ends thereof, a source of fluid under pressure correlated with engine speed in communication with one of said chambers and acting against the bias of the spring to advance the timing of the pumping strokes with increased engine speed, a fluid under pressure in the second of said chambers, a drainage passage for releasing fluid from the second chamber to reduce the pressure therein, and failsafe valve means for selectively controlling the release of fluid through said passage, said failsafe valve means comprising a bleed valve member and bleed valve control means operable by at least one set of continuous measurements of an operating parameter of the associated engine for operating the bleed valve member to continually bleed fluid from said second chamber in accordance with said continuous measurements.

2. The fuel injection pump of claim 1 wherein the control means is responsive to control pulses and maintains the valve in a fixed position in the absence of a control pulse.

3. The fuel injection pump of claim 1 wherein the control means comprises a linear stepper motor.

4. The fuel injection pump of claim 3 wherein the linear stepper motor is responsive to the output of an electronic control unit.

5. The fuel injection pump of claim 4, wherein signals indicative of said one set are applied to the electronic control unit, said electronic control unit having access to a data matrix, the output of said unit being a function of continuous comparisons of successive points of said sets with corresponding data points of said data matrix.

6. The fuel injection pump of claim 5, wherein said electronic control unit produces output pulses indicative of injection timing compensation to be applied to the timing means.

7. The fuel injection pump of claim 6, wherein said pulse energizes the linear stepper motor to shift a shaft axially to position the valve at a selective position.

8. The fuel injection pump of claim 1, wherein said control means comprises a piston which is positionable at selective positions corresponding to altitude.

9. The fuel injection pump of claim 8, wherein said piston is slidably received in a cylinder, the position of said piston in the cylinder being governed by a vacuum regulator in communication with a vacuum source and an aneroid device.

10. For use in association with an internal combustion engine having a plurality of engine cylinders, a fuel injection pump having a housing, a charge pump to deliver measured charges of liquid fuel in successive pumping strokes to the cylinders of the associated engine, timing means to vary the timing of the pumping strokes relative to the operation of the associated engine, and actuating means for actuating the timing means for advancing and retarding the timing of the pumping strokes responsive to the operating parameters of the associated engine, said actuating means comprising a spring biased piston for actuating the timing means and having fluid chambers at opposite ends thereof, means for varying the spring bias in response to a variation in the charge delivered by the charge pump, a source of fluid under pressure correlated with engine speed in communication with one of said chambers and acting against the bias of the spring to advance the timing of the pumping strokes with increased engine speed, a fluid under pressure in the second of said chambers, a drainage passage for releasing fluid from the second chamber to reduce the pressure therein, failsafe valve means for selectively controlling the release of fluid through said passage, said failsafe valve means comprising a bleed valve member and bleed valve control means operable by at least one set of continuous measurements of an operating parameter of the associated engine indicative of engine temperature, altitude, fuel density, or fuel injection angle for operating the bleed valve member to continually bleed fluid from said second chamber in accordance with said continuous measurements.

11. The fuel injection pump of claim 10, wherein said control means comprises a linear stepper motor responsive to output pulses of an electronic control unit, signals indicative of measurements of engine temperature, altitude and fuel injection angle being applied to said unit, said output pulses being indicative of optimum injection timing compensation given said measurements.

12. In a fuel injection pump for an internal combustion engine having a fuel injection nozzle for each engine cylinder, the fuel injection pump having a rotary input adapted to be driven by the engine, fuel pumping means, synchronized means, including pump actuating means for periodically actuating the pumping means in synchronism with the internal combustion engine for delivering high pressure fuel injection pulses to each fuel injection nozzle for injection of fuel charges into the engine cylinder, the pump actuating means being shiftable in advance and retard opposite directions thereof to respectively advance and retard the fuel injection pulse timing, a hydraulic cylinder, a timing piston mechanically connected to the shiftable actuating means and shiftable within the cylinder in advance and retard opposite directions thereof for mechanically shifting the pump actuating means in advance and retard directions thereof respectively, servo valve means including a servo valve cylinder, a unitary servo valve piston shiftable in advance and retard directions thereof within the servo valve cylinder for axially shifting the timing piston in advance and retard directions thereof respectively, fluid chambers at the opposite axial ends of the servo valve piston, servo spring means biasing the servo valve piston in one direction, advance bias control means providing a variable fluid pressure in one of the fluid chambers at one end of the servo valve piston to variably bias the servo valve piston in its advance direction, and retard bias control means providing a fluid pressure in a second fluid chamber at said other end of the servo valve piston to bias the servo valve piston in its retard direction, the improvement wherein the retard bias control means comprises pressure regulator means providing a regulated, variable fluid pressure in said second fluid chamber at the other end of the servo valve piston to variably bias the servo valve piston in its retard direction, the pressure regulator means comprising a fluid under pressure in said second fluid chamber, a drainage passage for releasing fluid from said second chamber to reduce the pressure therein, and failsafe valve means for selectively controlling the release of fluid through said passage, said failsafe valve means comprising a bleed valve member and bleed valve control means operable by at least one set of continuous measurements of an operating parameter of the associated engine for operating the bleed valve member to continually bleed fluid from said second chamber in accordance with said continuous measurements.

13. A fuel injection pump according to claim 12 wherein the pressure regulator means comprises means for continually conducting fluid to said second chamber at said other end of the servo valve piston and wherein the bleed valve member continually bleeds fuel from said second chamber at said other end of the servo valve piston to establish said regulated fluid pressure.

14. A fuel injection pump according to claim 12 wherein the bleed valve member is biased by said regulated fluid pressure in a direction to reduce said regulated pressure and said bleed valve control means comprises spring means biasing the bleed valve member in the opposite direction.

15. A fuel injection pump according to claim 12 further comprising load responsive means to vary the bias on the servo valve piston by the servo spring means.

* * * * *